US011412668B2

(12) United States Patent
Houweling

(10) Patent No.: US 11,412,668 B2
(45) Date of Patent: *Aug. 16, 2022

(54) GREENHOUSE AND FORCED GREENHOUSE CLIMATE CONTROL SYSTEM AND METHOD

(71) Applicant: GLASS INVESTMENTS PROJECTS, INC., Wilmington, DE (US)

(72) Inventor: Casey Houweling, Delta (CA)

(73) Assignee: Houweling Intellectual Properties, Inc., Ventura, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/174,043

(22) Filed: Feb. 6, 2014

(65) Prior Publication Data

US 2014/0150336 A1    Jun. 5, 2014

Related U.S. Application Data

(63) Continuation of application No. 11/824,159, filed on Jun. 28, 2007, now Pat. No. 8,707,617.

(51) Int. Cl.
*A01G 9/14* (2006.01)
*A01G 9/24* (2006.01)

(52) U.S. Cl.
CPC ............... *A01G 9/14* (2013.01); *A01G 9/24* (2013.01); *A01G 9/246* (2013.01); *Y02A 40/25* (2018.01)

(58) Field of Classification Search
CPC . A01G 9/14; A01G 9/24; A01G 9/241; A01G 9/246

(Continued)

(56) References Cited

U.S. PATENT DOCUMENTS

| 815,093 A | 3/1906 | Keeney |
| 1,506,904 A | 9/1924 | Harrison |

(Continued)

FOREIGN PATENT DOCUMENTS

| CA | 2592674 | 12/2007 |
| DE | 3331284 | 3/1985 |

(Continued)

OTHER PUBLICATIONS

First Office Action from Israel Patent Appl. No. 193844 dated Aug. 16, 2011.

(Continued)

*Primary Examiner* — David J Parsley
(74) *Attorney, Agent, or Firm* — Ferguson Case Orr Paterson LLP

(57) ABSTRACT

A greenhouse comprising a growing section and a climate control system adjacent to the growing section. The climate control system controls the environment within the growing section by flowing ambient air from outside the greenhouse into the growing section, re-circulating air from the growing section back into the growing section, or a combination thereof. A method for controlling the temperature within a greenhouse growing section comprises flowing air into the growing section from outside the greenhouse to reduce the temperature in the growing section. Warm air is flowed into the growing section to increase the temperature in the growing section, and air within the growing section is re-circulated when the temperature therein is at the desired level.

18 Claims, 5 Drawing Sheets

(58) Field of Classification Search
USPC .................................. 47/17, 19.2, 23.3, 29.5
See application file for complete search history.

(56) References Cited

U.S. PATENT DOCUMENTS

| | | | |
|---|---|---|---|
| 1,817,384 A | 8/1931 | Lewis | |
| 2,193,911 A | 3/1940 | Wright | |
| 3,124,903 A * | 3/1964 | Truhan | A01G 9/246 |
| | | | 454/251 |
| 3,274,730 A | 9/1966 | Bose | |
| 3,289,567 A | 12/1966 | Renner | |
| 3,348,922 A | 10/1967 | Bose et al. | |
| 3,404,618 A | 10/1968 | Jacobs | |
| 3,520,244 A * | 7/1970 | Gaines, Jr. | F16L 3/00 |
| | | | 138/107 |
| 3,747,501 A | 7/1973 | Osamu et al. | |
| 3,807,088 A | 4/1974 | Jones | |
| 3,824,909 A | 7/1974 | Horneff et al. | |
| 3,949,522 A | 4/1976 | Kehl et al. | |
| 4,163,342 A | 8/1979 | Fogg et al. | |
| 4,170,930 A | 10/1979 | Lind | |
| 4,196,544 A * | 4/1980 | Davis | A01G 7/045 |
| | | | 165/47 |
| 4,290,242 A * | 9/1981 | Gregory, Jr. | A01G 9/225 |
| | | | 47/17 |
| 4,292,762 A | 10/1981 | Fogg et al. | |
| 4,557,732 A | 12/1985 | Haehnke | |
| 4,567,732 A | 2/1986 | Landstrom et al. | |
| 4,567,939 A | 2/1986 | Dumbeck | |
| 4,586,342 A | 5/1986 | Morishita et al. | |
| 4,707,995 A | 11/1987 | Assaf | |
| 4,718,130 A | 1/1988 | Steinback | |
| 4,739,627 A | 4/1988 | Baumann et al. | |
| 4,916,642 A | 4/1990 | Kaiser et al. | |
| 5,001,659 A | 3/1991 | Watabe | |
| 5,001,859 A | 3/1991 | Sprung | 47/17 |
| 5,101,593 A | 4/1992 | Bhatt | |
| 5,212,903 A | 5/1993 | Talbott | 47/17 |
| 5,224,542 A | 7/1993 | Hemsath | |
| 5,299,383 A | 4/1994 | Takakura et al. | 47/58 |
| 5,315,834 A * | 5/1994 | Garunts | B01D 53/85 |
| | | | 62/78 |
| 5,392,611 A | 2/1995 | Assaf et al. | |
| 5,493,808 A | 2/1996 | Munday | |
| 5,553,417 A | 9/1996 | Chambers | |
| 5,713,154 A | 2/1998 | Goldstein et al. | |
| 5,813,168 A | 9/1998 | Clendening | 47/17 |
| 6,006,471 A | 12/1999 | Soo | |
| 6,705,043 B1 | 3/2004 | Opdam et al. | 47/17 |
| 6,978,573 B2 | 12/2005 | Van Der Heijden | 47/17 |
| 7,228,657 B2 | 6/2007 | Brault et al. | 47/17 |
| 8,707,617 B2 * | 4/2014 | Houweling | A01G 9/246 |
| | | | 47/17 |
| 9,730,397 B2 | 8/2017 | Houweling | |
| 2004/0194371 A1 | 10/2004 | Kinnis | |
| 2005/0005510 A1 | 1/2005 | Brault et al. | |
| 2008/0000151 A1 | 1/2008 | Houwling et al. | |
| 2010/0126062 A1 | 5/2010 | Houwling et al. | |

FOREIGN PATENT DOCUMENTS

| | | | |
|---|---|---|---|
| EP | 0517432 A1 | 5/1992 | |
| EP | 0856709 | 8/1998 | |
| EP | 1464218 A1 | 10/2004 | |
| EP | 1464219 | 10/2004 | |
| EP | 1464219 A1 | 10/2004 | |
| EP | 1598314 A1 | 11/2005 | |
| EP | 1199922 B1 | 1/2008 | |
| FI | 1199922 T3 | 4/2008 | |
| FR | 2713317 | 6/1995 | |
| GB | 693142 | 6/1953 | |
| GB | 1242500 | 8/1971 | 13/6 |
| GB | 2135442 | 8/1984 | |
| JP | 2008304111 A | 12/2008 | |
| NL | 6913348 A | 3/1971 | |
| NL | 8200360 | 9/1983 | |
| NL | 9001674 | 2/1992 | |
| NL | 9001874 A | 3/1992 | |
| NL | 1021856 | 11/2002 | |
| NL | 1023053 | 3/2003 | |
| NL | 1032779 C2 | 8/2003 | |
| NL | 2000152 | 7/2006 | |
| NL | 2000152 | 1/2008 | |
| NL | 1037250 | 9/2009 | |
| NL | 1038219 | 6/2011 | |
| WO | WO 1980000486 A1 | 3/1980 | |
| WO | WO 8606928 | 12/1986 | |
| WO | WO 2000076296 | 12/2000 | |
| WO | 03012344 | 2/2003 | |
| WO | 2004032606 A1 | 4/2004 | |
| WO | WO 2008/002686 A2 | 1/2008 | |
| WO | WO 2011028100 | 3/2011 | |
| WO | WO 2012078927 | 6/2012 | |

OTHER PUBLICATIONS

Further Office Action from Israel Patent Appl. No. 193844 dated Jul. 10, 2012.
Bird & Bird Statement of Defense, Counterclaim and Deed with Exhibits.
Kim, et al., "Improving the Distribution of Temperature by a Double Air Duct in the Air-Heated Plastic Greenhouse", Journal of Bio-Environmental Control 13(3) : 162-166 (2004).
International Preliminary Report on Patentability from PCT/NL2010/000127, dated Mar. 6, 2012.
Onderglas, Klimmat/Verwarming. Nummer 12, Dec. 2006. Jaargang 3 Gesolten of semi-gesolten.
"Evaluation of an Experimental Greenhouse Film with Improved Energy Performance" by Simpkins, et all.
W.J. Roberts, "Environmental Control of Greenhouses". Center for controlled Environment Agriculture. Cook College, Rutgers University, 19 pages.
"Semi-gesloten kas bokst op tegen woestijnklimaat" by Jelle Schoondereek.
"EuroFresh Tinkers With Greenhouse Design", by J. Benton Jones, Jr., www.growingedge.com.
Declaration of Jelle Schoonderbeek and attachment.
International Search Report From PCT/US2007/017083, dated Jan. 15, 2008.
International Search Report and Written Opinion from counterpart application PCT/US2010/001374 dated Aug. 24, 2010.
Intention to Grant from European Patent Appl. No. 07 810 937.8, dated Jun. 10, 2013.
Second Office Action from Mexican Patent Appl. No. MX/a/2007/008107, dated Apr. 8, 2013.
First Office Action from Mexican Patent Application No. MX/a/2007/008107 dated Dec. 15, 2012.
Examination Report for Canadian Patent Application No. 2,592,674, dated Jul. 18, 2012.
Office Action for counterpart Canadian Patent Application No. 2,592,674 dated Sep. 29, 2011.
EPO Communication Pursuant to Article 94(3) EPC in counterpart European Patent Application No. EP 07810937.8 dated Nov. 10, 2011.
Brief Description of Second Office Action from Israeli Patent Appl. No. 227472, dated Oct. 25, 2015.
Document submitted in opposition proceeding, AU 2010328690, dated Nov. 8, 2015.
Opponent's Supplementary Outline in Response, AU 2010328690, dated Dec. 7, 2015.
Amendment Amending a Specification re: AU 2010328690, dated Oct. 22, 2015.
Patent Oppositions Letter re: AU 2010328690, dated Dec. 15, 2015.
Full Patent Examination Report No. 1 re: AU 2010328690, dated Nov. 19, 2015.
Declaration of Mr. William Hunter re: AU 2010328690, dated May 25, 2015.

(56) References Cited

OTHER PUBLICATIONS

Declaration of Ms. Bianca Capra re: AU 2010328690, dated Feb. 12, 2015.
Statutory Declaration of Mr. Hubertus Wilhelmus Albertus Dries re: AU 2010328690, dated Jul. 27, 2015.
Statutory Declaration of Dr. Emilie Sauret re: AU 2010328690, dated Jul. 27, 2015.
Houweling Decision re: Upholding Patent, AU 2010328690, dated Feb. 12, 2016.
Houweling Outline of Submissions re: AU 2010328690, dated Nov. 16, 2015.
Article "Evaporative Cooling for Greenhouses", Paassen, et al. Diest voor Landbouwkundig Onderzoek; Instituut voor Merchanisatie Arbied en Gebouwen (IMAG-DLO), Wageningen. Technische Universiteit Delft (TUD Koudetechniek/klimaatregeling), Delft. Undated. Article in English and German.
Communication from EPO re: Third Party Observations, Application No. 07810937.8, dated Feb. 10, 2015.
Letter from Opponent/Cramwinckel Consultancy/J.M. van der Hoeven to EPO re: Opposition Division, Application No. 07810937.8, dated Oct. 16, 2015.
Submission in Opposition Proceedings from EPO listing documents, Application No. 07810937.8, Sep. 25, 2015.
Letter from AA Thornton to EPO re: Response to EPO Summons to Oral Proceedings, Application No. 07810937.8, dated Sep. 25, 2015.
Letter from AA Thornton to EPO re: Opposition against EP2031957, dated Jul. 28, 2015.
Letter from EPO to Nicholas South at A.A. Thornton re: Submission in opposition proceedings with document listed. Dated Jul. 28, 2015.
Communication from EPO to A.A. Thornton re: Oral Proceedings, Application No. 07810937.8, dated Oct. 16, 2015.
Communication from EPO sending Copy of Minutes, Application No. 07810937.8, dated Feb. 15, 2016.
Acknowledgment of Receipt EPO filing receipt re: Application No. 07810937.8, dated Jul. 28, 2015.
Communication from EPO to A.A. Thornton re: Observations by Third Party, Application No. 07810937.8, dated Sep. 7, 2015.
Acknowledgment of Receipt re: Opponent Submissions, Application No. EP07810937.8, dated Sep. 30, 2015.
EPO communication re: Revocation of EP patent, Appeal & Grounds of Appeal, dated Feb. 15, 2016.
Summons to Attend Oral Proceedings, Application No. 07810937.8, dated Jul. 17, 2015.
International Preliminary Report on Patentability from Appl. No. PCT/US2007/017083, dated Jan. 6, 2009.
Examination Report from European Patent Appl. No. 10 720 683.1-1655, dated Feb. 2, 2016.
Brief Description of third Office Action from Israeli Patent Appl. No. 227472, dated May 3, 2016.
Office Action from U.S. Appl. No. 12/636,549, dated Apr. 19, 2016.
Notice of Allowance from corresponding Mexican Patent Appl. No. MX/a/2012/005610, dated Dec. 26, 2014.
First Office Action from corresponding Mexican Patent Appl. No. MX/a/2012/005610, dated Aug. 11, 2014.
Notice of Acceptance/First Examination Report from corresponding New Zealand Patent Appl. No. 599383, dated Aug. 16, 2013.
Intention to grant from corresponding European Patent Appl. No. 10 720 683.1-1655, dated Nov. 22, 2016.
Certificate of Grant from corresponding Australian Patent No. 2010328690, dated Jul. 14, 2016.
Prosecution History of European Patent Application No. 07810937.8.
First Office Action from Israeli Patent Appl. No. 227472, dated Feb. 17, 2015.
Second Office Action from Israeli Patent Appl. No. 227472, dated Oct. 25, 2015.
First Office Action from Israeli Patent Appl. No. 220017, dated Oct. 25, 2015.

Office Action from Eurasian Patent Appl. No. 201291033/31, dated Mar. 28, 2016.
Office Action from Eurasian Patent Appl. No. 201291033/31, dated Aug. 1, 2016.
Case IPR 2017-00476 Exhibit 2019 of the Office Action for U.S. Appl. No. 11/824,159; dated Nov. 12, 2010.
Case IPR 2017-00476 Exhibit 2018 of the Office Action for U.S. Appl. No. 11/824,159; dated Mar. 25, 2010.
Case IPR 2017-00476 Exhibit 2017 of the Notice of Allowance for U.S. Appl. No. 11/824,159; dated Jan. 30, 2014.
Case IPR 2017-00476 Exhibit 2016 of the Office Action for U.S. Appl. No. 11/824,159; dated Sep. 25, 2013.
Case IPR 2017-00476 Exhibit 2015 of the Response to the Office Action for U.S. Appl. No. 11/824,159; dated Aug. 30, 2013.
Case IPR 2017-00476 Exhibit 2014 of the Office Action for U.S. Appl. No. 11/824,159; dated Jul. 30, 2013.
Case IPR 2017-00476 Exhibit 2013 of "Air Movement", Chapter 6, by Robert J. Downs and Donald T. Krizek.
Case IPR 2017-00476 Exhibit 2012; NJAES Research Greenhouse on Rutgers New Jersey Agricultural Experiment Station https://njaes.rutgers.edu/research-greenhouse/; Downloaded on Apr. 11, 2017.
Case IPR 2017-00476 Exhibit 2011; Cornell University Agricultural Experiment Station Science for Life Greenhouses & Growth Chambers.
Case IPR 2017-00476 Exhibit 2010; Cornell University Greenhouses and Growth Chambers on https://cuaes.cals.cornell.edu/greenhouses; Downloaded on Apr. 11, 2017.
Case IPR 2017-00476 Exhibit 2009 ; Duke Trinity College of Arts & Sciences, Biology, Phytotron overview on https://biology.duke.edu/facilities/phytotron; Downloaded on Apr. 11, 2107.
Case IPR 2017-00476 Exhibit 2008; NC State University Phytotron on https://phytotron.ncsu.edu/; Downloaded Apr. 11, 2017.
Decision Denying Institution of Inter Partes Review 37 C.F.R. § 42.108 for Case IPR 2016-01309; Dated Dec. 15, 2016.
Decision Denying Institution of Inter Partes Review 37 C.F.R. § 42,108 for Case IPR 2016-00014; Dated Mar. 23, 2016.
Case IPR 2017-00476 Exhibit 2003 of The Oxford American Dictionary and Thesaurus with Language Guide edition 2003.
Declaration of Alexander Turkewitsch in Support of Patent Owner's Preliminary Response to Petition for Inter Partes Review for Case IPR 2017-00476; Dated Apr. 11, 2017.
Case IPR 2017-00476 Exhibit 1032; Bom Group; Third Party Observations in Opposition against European Patent EP2031957; Aug. 28, 2015.
Notice of Allowance for Mexican Application No. MX/a/2012/005610; dated Dec. 26, 2014.
First Office Action for Mexican Application No. MX/a/2012/005610; dated Aug. 11, 2014.
Notice of Acceptance/First Examination Report for New Zealand Application No. 599383; dated Aug. 16, 2013.
Intention to Grant for European Application No. 10 720683.1-1655; dated Nov. 22, 2016.
Certificate of Grant for Australian Application No. 2010328690; dated Jul. 14, 2016.
First Office Action for Israeli Application No. 227472; dated Feb. 17, 2015.
Second Office Action for Israeli Application No. 227472; dated Oct. 25, 2015.
First Office Action for Israeli Application No. 220017; dated Oct. 25, 2015.
Office Action from corresponding Eurasian Patent Appl. No. 201291033/31, dated Mar. 28, 2016.
Office Action from Eurasian Patent Appl. No. 201291033, dated Aug. 1, 2016.
Second Office Action for Mexican Application No. MX/a/2007/008107; dated Apr. 8, 2013.
Intention to Grant from European Application No. 07810937.8; dated Jun. 10, 2013.
First Examination Report from Corresponding New Zealand Application No. 611982; dated Nov. 26, 2013.
Examiner Report on Canadian Application No. 2.620.897; dated Jan. 16, 2015.

(56) References Cited

OTHER PUBLICATIONS

First Exam Report for New Zealand Application No. 705354; dated Mar. 5, 2015.
Direction to Request Examination from Australian Application No. 2011338274; dated Apr. 14, 2015.
First Office Action for Mexican Application No. MX/a/2013/006519; dated Jul. 29, 2015.
Patent Examination Report for Australian Application No. 2011338274; dated Sep. 22, 2015.
Office Action for Mexican Application No. MX/a/2013/006519; dated Feb. 3, 2016.
Final Written Decision for Case IPR 2017-00476; dated Jun. 6, 2018.
Videotaped Deposition of Alexander Turkewitsch for Case IPR 2017-00476; Dated Dec. 13, 2017.
Second Declaration of Merle H. Jensen, PH.D. for Case IPR 2017-00476; Dated Jan. 5, 2018.
Declaration of Martin Van Zeijl for Case IPR 2017-00476; Dated Mar. 1, 2018.
Exhibit 1028 of Pictures for Case IPR 2017-00476.
Exhibit 1027 Drawing from Turkewitsch Deposition for Case IPR 2017-00476.
Exhibit 1025 Picture for Case IPR 2017-00476.
Exhibit 1024 Figure for Case IPR2017-00476.
Exhibit 1023 Doorsnede Sunergiekas Figures P.L.J. Bom Groep for Case IPR 2017-00476.
Exhibit 1022 Figure for Case IPR 2017-00476.
Exhibit 1018 for Case IPR 2017-00476; Greenhouses Advanced Technology for Protected Horticulture, by Joe J. Hanan; Dated Jan. 14, 1998.
Exhibit 1017 for Case IPR 2017-00476; Ecosystems of the World "20" Greenhouse Ecosystems, Copy 1; 1999.
Exhibit 1016 of the Response to the Office Action for U.S. Appl. No. 11/824,159; dated Nov. 12, 2010.
Exhibit 1015 of the Appeal Decision of European Patent No. 2031957; Dated Jun. 27, 2016.
Exhibit 1014 of the Decision Revoking the European Patent for European Patent No. 2031957; Dated Feb. 15, 2016.
Exhibit 1012 of the Proceedings for European Application No. 07810937.8; Dated Feb. 15, 2016.
Exhibit 1011 of the Merriam Webster's Collegiate Dictionary, Tenth Edition; Dated 1997.
Exhibit 1010 of the Complaint for Damages and Injunctive Relief for: Patent Infringement 35 U.S.C. § 271 for Case 2:16-cv-04291; Filed Jun. 15, 2016.
Exhibit 1002 Reisinger Figures; Dated Dec. 13, 2016.
Record of Oral Hearing for Case IPR 2017-00476; Dated Mar. 13, 2018.
Patent Owner's Opposition to Petitioner's Motion to Strike Exhibits 2040-2043 for Case IPR 2017-00476; Dated Mar. 23, 2018.
Petitioner's Motion to Strike Exhibits 2040-2043 for Case IPR 2017-00476; Dated Mar. 16, 2018.
Petitioner's Supplemental Mandatory Notices for Case IPR 2017-00476; Dated Mar. 7, 2018.
Petitioner's Objections to Patent Owner's Evidence for Case IPR 2017-00476; Dated Mar. 6, 2018.
Patent Owner's Reply to Petitioner's Opposition to Motion to Exclude Evidence for Case IPR 2017-00476; Dated Feb. 27, 2018.
Petitioner's Opposition to Patent Owner's Motion to Exclude Evidence for Case IPR 2017-00476; Dated Feb. 20, 2018.
Order Trial Hearing Under 37 C.F.R. § 42.70 for Case IPR 2017-00476; Dated Feb. 10, 2018.
Patent Owner's Request for Oral Argument for Case IPR 2017-00476; Dated Feb. 6, 2018.
Patent Owner's Motion to Exclude Evidence for Case IPR 2017-00476; Dated Feb. 6, 2018.
Petitioner's Request for Oral Argument for Case IPR 2017-00476; Dated Feb. 6, 2018.
Order Denying Authorization for Motion to Strike and Request for Sur-Reply 37 C.F.R. §§ 42.5 and 42.20 for Case IPR 2017-00476; Dated Jan. 31, 2018.
Notice of Filing of Jan. 23, 2018 Teleconference Transcript for Case IPR 2017-0076.
Patent Owner's Objections to Petitioner's Evidence Under 37 C.F.R. § 42.64 (b)(1); Dated Jan. 16, 2018.
Reply to Patent Owner's Response; dated Jan. 8, 2018.
Petitioner's Notice of Deposition of Alexander Turkewitsch for Case IPR 2017-00476; Dated Nov. 27, 2017.
Petitioner's Objections to Patent Owner's Evidence for Case IPR 2017-00476; Dated Oct. 10, 2017.
Patent Owner' Opposition to Institution of Inter Partes Review for Case IPR 2017-00476; Dated Oct. 2, 2017.
Notice of Deposition of Merle H. Jensen, PH.D. for Case IPR 2017-00476; Dated Aug. 23, 2017.
Joint Stipulation of Extension of Time For Due Dates 1 and 2 for Case IPR 2017-00476; Dated Aug. 23, 2017.
Patent Owner's Objections to Petitioner's Evidence Under 37 C.F.R. § 42.64(b)(1) for Case IPR 2017-00476; Dated Jun. 30, 2017.
Scheduling Order and General Instructions 37 C.F.R. § 42.5 for Case IPR 2017-00476; Dated Jun. 16, 2017.
Decision Granting Institution of Inter Partes Review 37 C.F.R. § 42.108 for Case IPR 2017-00476; Dated Jun. 16, 2017.
Petitioner's Supplemental Mandatory Notices for Case IPR 2017-00476; Dated May 26, 2017.
Patent Owner's Preliminary Response to Petition for Inter Partes Review for Case IPR 2017-00476; Dated Apr. 11, 2017.
Petitioner's Supplemental Mandatory Notices for Case IPR 2017-00476; Dated Apr. 4, 2017.
Patent Owner's Power of Attorney for Case IPR 2017-00476; Dated Feb. 27, 2017.
Patent Owner's Supplemental Mandatory Notices for Case IPR 2017-00476; Dated Feb. 27, 2017.
Notice of Filing Date Accorded to Petition and Time for Filing Patent Owner Preliminary Response for Case IPR 2017-00476; Dated Jan. 11, 2017.
Houweling Nurseries Oxnard, Inc.'s Mandatory Notices Pursuant to 37 C.F.R. § 42.8(a)(2) for Case IPR 2017-00476; Dated Jan. 5, 2017.
Petitioner's Power of Attorney In An Inter Partes Review for U.S. Pat. No. 8,707,617; Dated Apr. 29, 2014.
Petition for Inter Partes Review for U.S. Pat. No. 8,707,617; Dated Dec. 14, 2016.
Declaration of Amy Candeloro for Case IPR 2017-00476; Dated Feb. 27, 2018.
Opponents Observations in preparation for the Oral Proceedings for Application No. EP07810937.8; Dated Sep. 25, 2015.
Timeline for Innovations on http://www.bomgroup.nl/welcome/innovations/; Dated Feb. 27, 2018.
Wayback Machine 2014 Calendar on http://www.bomgroup.nl/welcome/innovations; Date Downloaded Feb. 27, 2018.
Final Written Decision 35 U.S.C. § 318(a) and 37 C.F.R. § 42.73 for Case IPR 2016-00594; Dated Aug. 24, 2017.
ExifPro Image Viewer Home Screen on http://www.exifpro.com/ for case IPR 2017-00476; Downloaded on Feb. 6, 2018.
Patents Held on http://www.houwelings.com/files-2/patents.php; Downloaded on Oct. 2, 2017.
Horti Daily Worldwide exclusive patents for Houweling's semi-closed greenhouse on http://www.hortidaily.com/print.asp?id=6571; Published on Feb. 19, 2014.
Declaration of Alexander Turkewitsch in Support of Patent Owner's Opposition to Petition for Inter Partes Review for Case IPR 2017-00476; Dated Oct. 2, 2017.
Videotaped Examination of Merle H. Jensen, PH.D.; Dated Sep. 7, 2017.
Case IPR 2017-00476 Exhibit 2026 of European Publication No. EP 1 464 219 A1; Exhibit Dated Sep. 7, 2017.
Case IPR 2017-00476 Exhibit 2025 of The Sunergy Greenhouse—One Year of Measurements in a Next Generation Greenhouse; Exhibit dated Sep. 7, 2017.

(56) References Cited

OTHER PUBLICATIONS

Case IPR 2017-00476 Exhibit 2024 of Using Semi-Closed Greenhouses to Maximize Production while Minimizing Inputs and Waste; Exhibit Dated Sep. 7, 2017.
Case IPR 2017-00476 Exhibit 2023 of Environmentally friendly greenhouses in Camarillo impresses experts on http://archive.vcstar.com/business/environmentally-friendly-greenhouses-in-camanllo-impresses-experts-ep-371888266-350864911.html; Dated May 15, 2009.
Case IPR 2017-00476 Exhibit 2022 of Innovation on http://www.houwelings.com/files-2/innovation.php; Downloaded Apr. 11, 2017.
Case IPR 2017-00476 Exhibit 2021 of the Response to Office Action for U.S. Appl. No. 11/824,159; dated Jun. 21, 2013.
Case IPR 2017-00476 Exhibit 2020 of the Office Action for U.S. Appl. No. 11/824,159; dated Mar. 15, 2013.
Declaration of Amy Candeloro for Case IPR 2017-00476; Dated Oct. 2, 2017.
Exhibit 2035 of Merriam-Webster's Collegiate Dictionary, Eleventh Edition for Case IPR 2017-00476.
Final Written Decision for Case IPR 2014-00309; Dated Mar. 23, 2014.
Exhibit 2033 for Case IPR 2017-00476, "The Snack: Dave's Specialty Produce"; dated Sep. 2017.
Exhibit 2032 for Case IPR 2017-00476, "The Packer: U.S. Grants patent for Ultra-Clima greenhouse system"; dated Feb. 26, 2014.
Exhibit 2031 for Case IPR 2017-00476, "Ventura County Star: Greenhouse design and patent bring fewer pests and more revenue to Houweling's Tomatoes"; Dated Apr. 19, 2014.
Official Action from corresponding European Appl. No. 201291033, dated Aug. 19, 2014.
Notice of Opposition from Australian Patent Appl. No. 2010328690, dated Aug. 15, 2014.
Notice of Allowance from Canadian Patent Office, Appl. No. 2,777,694, dated Aug. 4, 2016.
Official Action from Eurasian Patent Appl. No. 201291033, dated Oct. 27, 2015.
Statutory Declaration in the matter of Aus. Patent Appl, No. 2010328690.
Observations by a third party from European Patent Application No. 10720683.1-1655/2521436, dated Feb. 6, 2014.
Office Action dated Nov. 24, 2020 for U.S. Appl. No. 15/676,899 (pp. 1-17).
Prosecution of EP Application No. 13184198.3 (EP2698057A), Extended European Search Report, dated Jul. 28, 2017.
Prosecution of EP Application No. 13184198.3 (EP2698057A), Exam Report, dated Jul. 16, 2018.
IPR2017-00476, *J.M. van der Hoeven B.V. v. Houweling Nurseries*, Paper 1—Petition for Inter Partes Review U.S. Pat. No. 8,707,617 IPR2017-00476, Dec. 14, 2016.
IPR2017-00476, *J.M. van der Hoeven B.V. v. Houweling Nurseries*, Paper 10—Decision Instituting IPR, Jun. 16, 2017.
IPR2017-00476, *J.M. van der Hoeven B.V. v. Houweling Nurseries*, Paper 18—Petitioner's Reply to Patent Owner's Response, Jan. 8, 2018.
IPR2017-00476, *J.M. van der Hoeven B.V. v. Houweling Nurseries*, Paper 33—Final Written Decision, Jun. 6, 2018.
IPR2017-00476, *J.M. van der Hoeven B.V. v. Houweling Nurseries*, Ex. 1001—U.S. Pat. No. 8,707,617, Dec. 14, 2016.
IPR2017-00476, *J.M. van der Hoeven B.V. v. Houweling Nurseries*, Ex. 1002—Declaration of Merle Jensen, Ph.D., Dec. 14, 2016.
IPR2017-00476, *J.M. van der Hoeven B.V. v. Houweling Nurseries*, Ex. 1003—EP1464219A1 (Reisinger), with certified English translation, Dec. 14, 2016.
IPR2017-00476, *J.M. van der Hoeven B.V. v. Houweling Nurseries*, Ex. 1004—U.S. Pat. No. 3,807,088 (Jones), Dec. 14, 2016.
IPR2017-00476, *J.M. van der Hoeven B.V. v. Houweling Nurseries*, Ex. 1005—US2005/0005510A1 (Brault), Dec. 14, 2016.
IPR2017-00476, *J.M. van der Hoeven B.V. v. Houweling Nurseries*, Ex. 1006—U.S. Pat. No. 4,916,642 (Kaiser), Dec. 14, 2016.
IPR2017-00476, *J.M. van der Hoeven B.V. v. Houweling Nurseries*, Ex. 1007—U.S. Pat. No. 4,707,995 (Assaf), Dec. 14, 2016.
IPR2017-00476, *J.M. van der Hoeven B.V. v. Houweling Nurseries*, Ex. 1008—US2004/0194371A1 (Kinnis), Dec. 14, 2016.
IPR2017-00476, *J.M. van der Hoeven B.V. v. Houweling Nurseries*, Ex. 1009—U.S. Pat. No. 4,567,732 (Landstrom), Dec. 14, 2016.
IPR2017-00476, *J.M. van der Hoeven B.V. v. Houweling Nurseries*, Ex. 1010 Complaint in *Houweling Nurseries Oxnard, Inc. v. Little Leaf Farms, LLC*, Case No. 2:16-CV-04291 AB (JEMx), Dec. 14, 2016.
IPR2017-00476, *J.M. van der Hoeven B.V. v. Houweling Nurseries*, Ex. 1011—Merriam-Webster's Collegiate Dictionary (10th ed. 1997), Dec. 14, 2016.
IPR2017-00476, *J.M. van der Hoeven B.V. v. Houweling Nurseries*, Ex. 1012—Minutes of oral proceedings in the EPO Opposition of EP2031957B1, dated Feb. 15, 2016, Dec. 14, 2016.
IPR2017-00476, *J.M. van der Hoeven B.V. v. Houweling Nurseries*, Ex. 1013—Reasons for the decision revoking EP2031957B1 in the EPO Opposition, dated Feb. 15, 2016, Dec. 14, 2016.
IPR2017-00476, *J.M. van der Hoeven B.V. v. Houweling Nurseries*, Ex. 1014—Decision revoking EP2031957B1 in the EPO Opposition, dated Feb. 15, 2016, Dec. 14, 2016.
IPR2017-00476, *J.M. van der Hoeven B.V. v. Houweling Nurseries*, Ex. 1015—Grounds of Appeal in Appeal No. T0957/16-3.2.04, dated Jun. 27, 2016 (without enclosures), Dec. 14, 2016.
IPR2017-00476, *J.M. van der Hoeven B.V. v. Houweling Nurseries*, Ex. 1016—Apr. 5, 2011 Request for Continued Examination in U.S. Appl. No. 11/824,159, filed Dec. 14, 2016.
IPR2017-00476, *J.M. van der Hoeven B.V. v. Houweling Nurseries*, Ex. 1017—Greenhouse Ecosystems, in 20 Ecosystems of theWorld (G. Stanhill & H. Zvi Enoch eds., 1999), Dec. 14, 2016.
IPR2017-00476, *J.M. van der Hoeven B.V. v. Houweling Nurseries*, Ex. 1018—Joe J. Hanan, Greenhouses: Advanced Technology for Protected Horticulture (1998), Dec. 14, 2016.
IPR2017-00476, *J.M. van der Hoeven B.V. v. Houweling Nurseries*, Ex. 1019—Library of Congress Online Catalog—Item Information (Full Record) for: Merriam-Webster's Collegiate Dictionary (10th ed. 1997), Served but Not Filed.
IPR2017-00476, *J.M. van der Hoeven B.V. v. Houweling Nurseries*, Ex. 1020—Library of Congress Online Catalog—Item Information (Full Record) for: Greenhouse Ecosystems, in 20 Ecosystems of the World (G. Stanhill & H. Zvi Enoch Eds., 1999), Served but Not Filed.
IPR2017-00476, *J.M. van der Hoeven B.V. v. Houweling Nurseries*, Ex. 1021—Library of Congress Online Catalog—Item Information (Full Record) for: Joe J. Hanan, Greenhouses: Advanced Technology for Protected Horticulture (1998), Served but Not Filed.
IPR2017-00476, *J.M. van der Hoeven B.V. v. Houweling Nurseries*, Ex. 1022—Cross-flow fan images, Jan. 8, 2018.
IPR2017-00476, *J.M. van der Hoeven B.V. v. Houweling Nurseries*, Ex. 1023—SunergieKas® technical drawings, Jan. 8, 2018.
IPR2017-00476, *J.M. van der Hoeven B.V. v. Houweling Nurseries*, Ex. 1024—Three-dimensional model of Bom's stand at the Horti Fair 2005, Jan. 8, 2018.
IPR2017-00476, *J.M. van der Hoeven B.V. v. Houweling Nurseries*, Ex. 1025—Photograph of Bom's stand at the Horti Fair 2005, Jan. 8, 2018.
IPR2017-00476, *J.M. van der Hoeven B.V. v. Houweling Nurseries*, Ex. 1026—Mar. 6, 2017 letter from Patent Owner's representative in the appeal of the EPO opposition, Jan. 8, 2018.
IPR2017-00476, *J.M. van der Hoeven B.V. v. Houweling Nurseries*, Ex. 1027—Drawing made by Mr. Turkewitsch at his deposition, Jan. 8, 2018.
IPR2017-00476, *J.M. van der Hoeven B.V. v. Houweling Nurseries*, Ex. 1028—Photographs of the Van der Lans SunergieKas® greenhouse, Jan. 8, 2018.
IPR2017-00476, *J.M. van der Hoeven B.V. v. Houweling Nurseries*, Ex. 1029—Declaration of Martin Van Zeijl, Jan. 8, 2018.
IPR2017-00476, *J.M. van der Hoeven B.V. v. Houweling Nurseries*, Ex. 1030—Second Declaration of Merle H. Jensen, PhD., Jan. 8, 2018.

(56) References Cited

OTHER PUBLICATIONS

IPR2017-00476, *J.M. van der Hoeven B.V. v. Houweling Nurseries*, Ex. 1031—Deposition of Alexander Turkewitsch, Dec. 13, 2017, Jan. 8, 2018.
IPR2017-00476, *J.M. van der Hoeven B.V. v. Houweling Nurseries*, Ex. 1032—Third Party Observations in the EPO opposition, dated Aug. 28, 2015, Jan. 8, 2018.
International Search Report for International Application No. PCT/US2007/017083, dated Jan. 15, 2008. 3 pages.
P.L.J. Bom Groep, Press information distributed at the Horti Fair Nov. 2, 2005. 5 pages.
Gabot.de webpage retrieved Dec. 10, 2005.
EnerDes "Invention of the Semi-Closed Greenhouse" retrieved Oct. 25, 2016 from http://enerdes.com/invention-semi-closed-greenhouse/.
International Preliminary Report on Patentability for International Application No. PCT/US2010/001374, dated Jul. 29, 2013. 4 pages.
Netherlands Patent Application No. 1037250 filed Sep. 3, 2009 on behalf of Priva B.V.
Office Action dated Jun. 22, 2021 for U.S. Appl. No. 15/676,899 (pp. 1-19).
Brief Communication Letter from Opponent dated Jan. 7, 2020 to European Patent No. 2521436.
Brief Communication Lettre from Opponent dated Dec. 4, 2018 to European Patent No. 2521436.
Office Action (Final Rejection) dated Nov. 10, 2021 for U.S. Appl. No. 15/676,899 (pp. 1-20).
Brief Communication Copy of Intermediate Communication to European Patent No. 2521436.
Brief Communication Letter from Opponent of Jan. 7, 2020 to European Patent No. 2521436.
Brief Communication Lettre from Opponent of Dec. 4, 2018 to European Patent No. 2521436.
Letter to the EPO Boards of Appeal in the Opposition against European Patent No. EP2521436. Submitted Nov. 2, 2020. 10 pages.
Office Action (Final Rejection) dated Feb. 16, 2022 for U.S. Appl. No. 15/990,578 (pp. 1-16).
Office Action (Final Rejection) dated Nov. 10, 2021 for U.S. Appl. No. 15/990,578 (pp. 1-20).
Office Action dated Jul. 7, 2021 for U.S. Appl. No. 15/990,578 (pp. 1-15).
Translation of Mexican Office Action for App. No. MX/a/2018/001526, dated Oct. 14, 2021, 2 pages.
Office Action (Non-Finai Rejection) dated May 24, 2022 for U.S. Appl. No. 15/676,899 (pp. 1-20).

\* cited by examiner

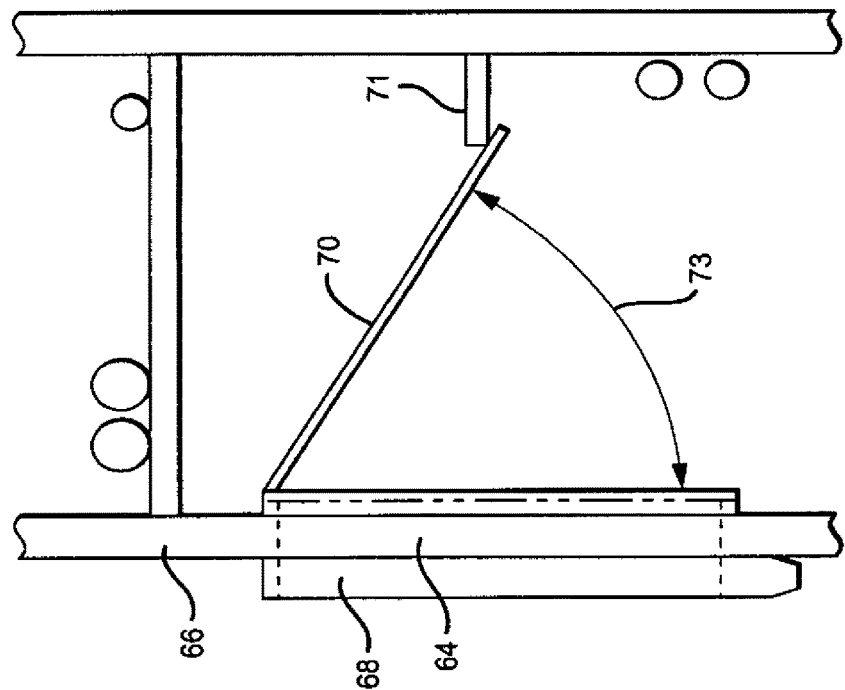
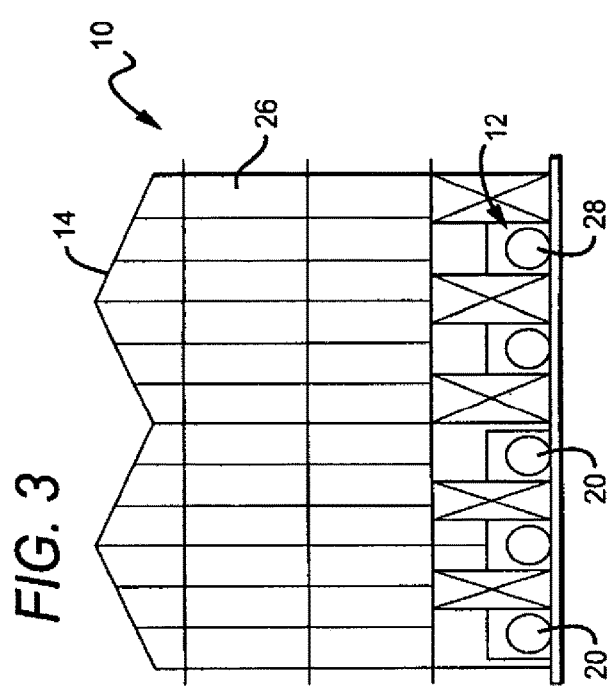
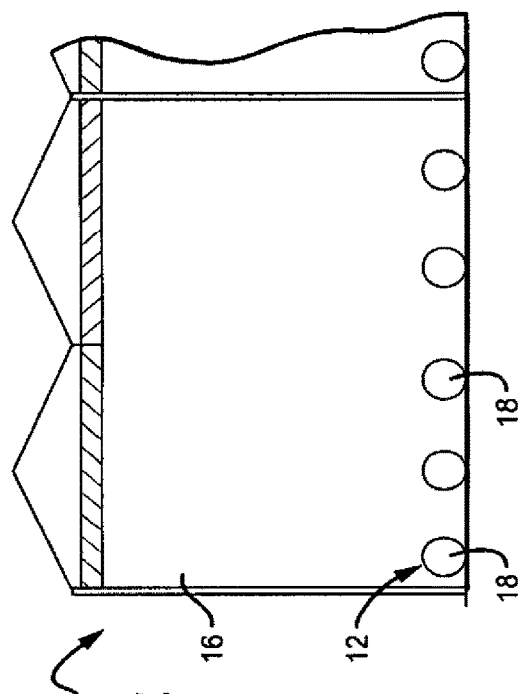

GREENHOUSE AND FORCED GREENHOUSE CLIMATE CONTROL SYSTEM AND METHOD

CROSS REFERENCE TO RELATED APPLICATIONS

This application is a continuation of, and claims the benefit of, U.S. patent application Ser. No. 11/824,159 to Casey Houweling, entitled Greenhouse and Forced Greenhouse Climate Control System and Method, filed on Jun. 28, 2007, which claims the benefit of U.S. Provisional Patent Application No. 60/817,755 to Houweling, filed on Jun. 29, 2006. Both of these applications are hereby incorporated herein in their entirety by reference.

BACKGROUND OF THE INVENTION

Field of the Invention

This invention relates to greenhouses and more particularly to climate control systems for greenhouses.

Background of the Invention

Greenhouses have been used for hundreds of years to grow different varieties of plants, including ornamental plants and fruit/vegetable producing plants. Greenhouses typically comprise a structure with a plastic or glass roof and frequently glass or plastic walls. The interior of the greenhouse can be heated by incoming solar radiation that warms the plants and soil therein. The closed environment of a greenhouse has its own unique requirements compared with outdoor production. Pests and diseases need to be controlled and irrigation is necessary to provide water. Of equal importance, greenhouses can also be arranged to compensate for extreme highs and lows of heat and humidity, and to generally control the environmental conditions such as the level of carbon dioxide ($CO_2$).

Different greenhouses have been developed to control the environmental conditions in a greenhouse. U.S. Pat. No. 5,001,859 to Sprung describes a method and structure for environmental control of plant growth in greenhouse conditions. The structure comprises a translucent stressed fabric shell on a base, with which to grow plants, the shell and base sealing the environment within the space against external environmental conditions. The temperature and relative humidity within the production areas are generally controlled by a microprocessor based series of spray systems, along with a furnace. The spray systems can lower the temperature in the space while at the same time increasing humidity, and the furnace can be utilized to increase the temperature within the space.

U.S. Pat. No. 5,813,168 to Clendening describes a greenhouse and a method for controlling the environment of the interior space of the greenhouse. The greenhouse includes an interior insulating panel and a movable exterior reflective panel capable of both insulating the interior of the greenhouse and reflecting sunlight into the interior. The greenhouse also includes a closed-system heat exchanger having a plurality of spaced water-impermeable water flow passageways through which water flows by gravitational forces and having a means for blowing air between the water flow passageways such that the air does not contact the water and such that the air is either heated or cooled by the water. In addition, the heat exchanger may include a water discharge and/or a gas discharge for the control of humidity and gas levels within the greenhouse. Finally, the greenhouse includes hydroponic plant beds disposed on top of the heat exchangers and hydroponic solution tanks along the outer interior walls of the greenhouse.

U.S. Pat. No. 5,212,903 to Talbot discloses a greenhouse for providing environmental control for growing plants comprising a frame defining a structure forming an interior region for holding plants. A flexible cover is positioned over the frame for providing a roof enclosure for the structure, and an elongate roller extends along the length of the structure secured to a lengthwise edge of the cover. A power source is coupled to the roller driving the roller about its longitudinal axis to retract or extend the cover relative to the frame. The greenhouse also includes a water distribution system that includes a distribution conduit with spaced-apart spray nozzles positioned adjacent the top interior of the greenhouse. A power drive system oscillates the conduit through a defined are to distribute water downwardly to plants growing in the greenhouse. A timing means is associated with the power drive for delaying the return rotation of the conduit to ensure that the outside edges of the spray pattern will be watered evenly.

U.S. Pat. No. 7,228,657 to Brault et al. discloses a greenhouse having an exterior curtain wall structure formed by spaced tubular posts carrying external transparent panels and bottom non-transparent wall panels below a sill with the panels spanning the posts. A plurality of elongate benches is located within the interior at spaced positions along one side wall with the width of the benches being equal to the post spacing to form an expandable construction. Each bench has associated with it a respective air handling system for conditioning including a duct which is located partly under the respective bench and a fan in a fan housing at the side wall. From the fan a vertical duct section extends to a flexible tube extending over the bench. Air dehumidification, fogging, heating and cooling are provided in the duct under the bench. An alley is arranged along the opposite wall containing electrical controls mounted in cabinets forming panels for mounting in the span between posts.

European Patent Application No. EP 1 464 218 A1 discloses a method for growing crops arranged in a greenhouse that is closed off from the environment and wherein the climate is regulated and watering of the crop is controlled within by a watering device. The photosynthesis and yield of the crop is regulated by controlling, independent of the outside conditions, the $CO_2$ concentration in the greenhouse and the transpiration by regulation of the temperature and air movements around the crop. Air regulating means can be utilized such as partitions, screens and the like, and outlet openings for air at different heights near the crop are provided so that the climate near the crop, and in particular the microclimate near the leaves of the crop, can be regulated and monitored.

International Application No. PCT/NL2000/000402 (Publication No. WO 2000/076296) discloses a market garden greenhouse system in which plant products can be cultivated. The market greenhouse is closed in that it is substantially not provided with ventilating openings or ventilating windows that can be opened. The greenhouse comprises heat regulating means for regulating heat therein, with heat generating from solar energy and a heating system. The greenhouse can also comprise an air humidity regulating and surplus heat is removed from the greenhouse to an aquifer in the summer.

SUMMARY OF THE INVENTION

One embodiment of greenhouse according to the present invention comprises a growing section and a climate control system adjacent to the growing section. The climate control system controls the environment within said growing section by flowing ambient air from outside the greenhouse into the growing section, re-circulating air from the growing section back into the growing section, or a combination thereof.

Another embodiment of a greenhouse according to the present invention comprises a substantially enclosed growing section and a substantially enclosed end gable adjacent to the growing section. The end gable is arranged to flow cool air into said growing section to reduce the temperature therein, to flow warm air into the growing section to increase the temperature therein, and to re-circulate air within the growing section when the temperature therein is at the desired level.

One embodiment of a method for controlling the temperature within a greenhouse growing section, comprises flowing air into the growing section from outside the greenhouse to reduce the temperature in the growing section. Warm air is flowed into the growing section to increase the temperature in the growing section, air within the growing section is re-circulated when the temperature therein is at the desired level.

These and other aspects and advantages of the invention will become apparent from the following detailed description and the accompanying drawings which illustrate by way of example the features of the invention.

BRIEF DESCRIPTION OF THE DRAWINGS

FIG. 3 is an end view of one embodiment of a greenhouse climate control system according to the present invention;

FIG. 4 is a sectional view of one embodiment of a greenhouse climate control system according to the present invention at the crop section of the greenhouse.

FIG. 7 shows the louver and first vent feature of the greenhouse climate control system in FIG. 5.

DETAILED DESCRIPTION OF THE INVENTION

Figure 1:
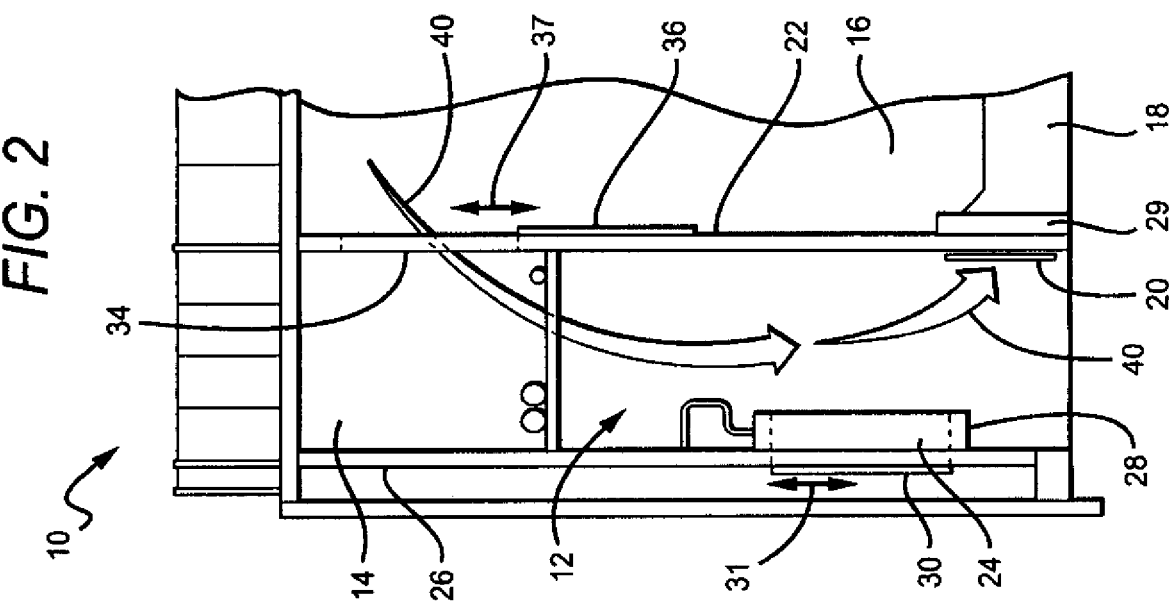
FIG. 1 is a side sectional view of one embodiment of a greenhouse and its climate control system according to the present invention.

The present invention generally relates to improved greenhouses and forced greenhouse climate control systems that are arranged to operate in different modes to control the temperature and environmental conditions within the greenhouse. In one mode ambient air is drawn into the greenhouse, and in other modes air from within the greenhouse is re-circulated. In still other modes, the system can draw ambient air in combination with recirculation of air, and when ambient air is drawn in, it can also be cooled. This arrangement provides for control of the greenhouse climate using a simple and cost effective system.

In one embodiment of a greenhouse and greenhouse climate control system according to the present invention, tubes are provided along the full length of the greenhouse growing section. Ambient and or re-circulated air is drawn into the tubes and each of the tubes has a means for allowing air to exit along its length, such as through holes along the length of the tubes. The number and size of holes is arranged to promote even distribution of air from the tubes throughout the greenhouse structure. It is understood that other devices can be used beyond tubes for flowing air into the greenhouse, and different means for allowing air to exit from the tubes can be used. The separation (spacing) between the tubes can vary and the diameter of the tubes can vary depending on the particular circumstances including but not limited to the surrounding climate, or crops being grown. In different embodiments the tubes can also be above the greenhouse crop or below gutters tables or other systems in the greenhouse.

Fans or other mechanisms for drawing air are arranged on the tubes to supply a flow of air volume to the tubes to cool the greenhouse during the expected elevated outside (external) temperatures and to heat the greenhouse during expected low temperatures. In one embodiment, a respective one of fans is located at one end of each of the tubes and flows air into and along the length of the its tube. It is understood, however, that the fans can be located in other positions on the tubes and a single fan can be used to flow air into more than one of the tubes.

The climate control system according to the present invention is also arranged to efficiently flow air of different temperatures into the tubes to control the temperature in the greenhouse during temperature cycles of the surrounding climate. When the temperature within the greenhouse rises, cooler gasses are provided to the greenhouse tubes, and in one embodiment the cooler air is provided from the ambient air outside the greenhouse. Systems can also be used to further cool the ambient air as it enters the greenhouse, if necessary. When the temperature in the greenhouse is at or near the desired level air from within the greenhouse can be circulated into the tubes. When the temperature within the greenhouse falls, known internal heater systems can be used to heat the air in the greenhouse with the heated air re-circulated to the tubes. To achieve the desired temperature within the greenhouse a controller can be employed to automatically provide for the different modes above or provide a combination of the modes. The systems according to the present invention can also control the pressure within the greenhouse and the level of certain gases such as carbon dioxide ($CO_2$).

The present invention is described herein with reference to certain embodiments but it is understood that the invention can be embodied in many different ways and should not be construed as limited to the embodiments set forth herein. In particular, the present invention is described below in regards to greenhouse features arranged in a particular way but it is understood that these features can be arranged in different ways and can be used in other applications.

It is also understood that when an element or feature is referred to as being "on" or "adjacent" another element or feature, it can be directly on or adjacent the other element or feature or intervening elements or features may also be present. Furthermore, relative terms such as "outer", "above", "lower", "below", and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention.

Embodiments of the invention are described herein with reference to different views and illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein but are to include deviations in shapes that result, for example, from manufacturing.

FIGS. 1-4 show one embodiment of greenhouse 10 utilizing a forced greenhouse climate control system 12 according to the present invention. The greenhouse 10 has a gabled end 14 that is separated from the crop growing section 16 of the greenhouse by partition 22. The majority of the climate control system 12 is housed within the gabled end 14 with a portion of the system continuing into the crop growing section 16. The crop section 16 comprises a portion of the system comprising devices for distributing air from the gabled end 14 throughout the crop growing section 16. Many different distribution devices can be used, with a suitable device being a plurality of tubes 18 running the length of the crop section. As mentioned above, different numbers of tubes can be used with greenhouse 10 shown having five (5) tubes 18. The tubes 18 open through the partition 22 such that air from the gabled end 14 can flow into the tubes 18 and pass into the growing end through tube holes. Different numbers and sizes of holes can be included along the length of the tubes 18 to insure even distribution.

Fans 20 can placed on or close to the bottom of the partition 22 between the gabled end 14 and the section 16 each at a respective one of the tubes 18. The fans 20 are arranged to pull or flow air into its respective one of the tubes 18 from in the gabled end 14. The air in the gabled end 14 can include ambient air from outside the greenhouse or air from inside the crop section 16 during recirculation, or combination of the two. As more fully described below, this is accomplished by a louver and vent system within the greenhouse 10.

The greenhouse 10 further comprises a first vent/opening 24 ("first vent") in the outside gable wall 26 through which ambient air can enter the gabled end 14. The first vent 24 can be arranged in many different locations, with a suitable location as shown being on the lower portion of the outside gable wall. In the embodiment shown, one first vent 24 is shown, but it is understood that more than first vent can be included. The first vent 24 can be arranged in many different ways, with the preferred vent running substantially the length of the outside gable wall 26.

A cooling mechanism 28 can be included at the first vent 24 to cool air being pulled into the gabled end 14, and/or to control the humidity within the air. In one embodiment the cooling mechanism 28 is a conventional pad cooling system that is known in the art and not described in detail herein. A screen can also be included over the vent 24 to prevent insects and other pests from entering the greenhouse 10.

In some embodiments, a heat exchanger 29 can be included at or near the fans 20 to further heat or cool the air passing into the tubes 19. Heat exchangers are generally known in the art and the basic operation is only briefly discussed herein. According to the present invention, the greenhouse 10 can be arranged to store heated water from the heat exchanger for use in heating the greenhouse at a later time.

The heat exchanger 29 relies on a flow of water to cool air passing through the fan 20 as it enters the tube 19. The cooling of the air by the water passing though the heat exchanger can result in the warming of the water flowing through the heat exchanger. In some embodiments, this warmed water can be stored in a separate storage tank for later use in warming the air in the crop section 16. For example, warm water can fill the storage tank when cooling air when the temperature of the air entering the is high, such as during the day. The warmed water can be stored and at night, when the temperature dips, the warm water can be flowed into the heat exchanger 29 to warm the air passing into the tubes.

A first louver 30 can be included at the outside gable wall 26 that is movable in the directions of arrow 31 to control the amount of air entering the end gable 14. When operating in the mode to block air from entering the end gable 14 the louver is lowered to cover the first vent 24. When operating in the mode to allow air to enter the end gable 14, the louver 30 can be raised so that it is not blocking air from entering or can be partially raised such that it is partially blocking air from entering. As shown, the first louver 30 can be a planar shield that can slide down to fully or partially cover the first vent 24 depending on the desired amount of air to pass through the vent 24. It is understood that many different mechanisms can be used beyond the first louver 30 described above and the second louver described below.

The partition 22 comprises a second vent 34 that is located near the top of the partition 22, although the vent 34 can be in many different locations. A second louver 36 can be included at the partition 22 that operates similar to the first louver 30. The second louver 36 can be moved in the direction of arrow 37 to block air from entering through the second vent 34, or can be moved so that it is not blocking air from entering or is partially blocking air from entering. Like the first louver, the second louver 36 can be a planar shield that can slide down to fully or partially cover the second vent 34 depending on the desired amount of air to pass through the vent 34.

The crop section 16 of the greenhouse 10 can also comprise one or more conventional greenhouse vents (not shown) to allow excess air to be released from the greenhouse 10. This is particularly useful when ambient air is being drawn into the greenhouse. The release of air through the vents releases excess air that can build up in the crop section 16. These vents are generally known in the art and are not described herein. It is understood that these vents can also include screens to prevent insects from entering and the vents are preferably located at or near the greenhouse roof. In some embodiments, the vents can include fans to assist in the release of air, and it is understood that air can be released from the greenhouse using many different mechanisms beyond conventional vents.

In operation, when the air temperature within the crop section 16 rises it may be desirable to pull cooler air into the section 16. This is referred to as the cooling mode and is illustrated by the first airflow 38 shown in FIG. 1. The second louver 36 can be closed and the first louver 30 can be at least partially opened to allow air to pass through the first vent 24. Fans 20 can be activated to pull greenhouse ambient air through the first vent 24 and in those embodiments where additional cooling of the air is desired, the cooling mechanism 28 can be activated to cool the air pulled through the vent 24. The cooled air enters the gabled end 14 and is pulled into the tubes 18 by the fans 20. The cooled air is then distributed evenly throughout the crop section 16 through the holes in the tubes 18. The heat exchange 29 can also contain a flow of water to further cool water entering the tubes 18. As additional ambient air is pulled into the greenhouse, excess air can be released from the greenhouse through roof vents.

Figure 2:
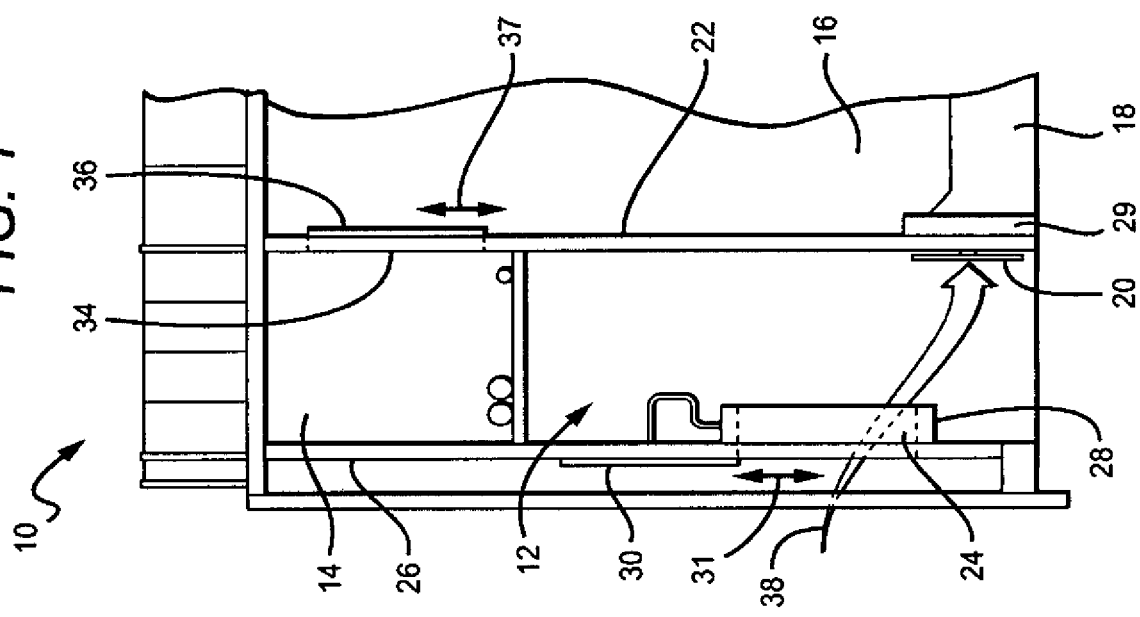
FIG. 2 shows the greenhouse climate control system in FIG. 1 showing another mode of air flow.

When the air within the greenhouse is at the desired temperature or needs to be increased, the greenhouse enters the recycle mode as shown by second airflow 40 is FIG. 2. The first louver 30 can be closed and the second louver 36 opened. The fans 20 can then be activated to pull air from within the greenhouse section 16 into the gabled end 14. The air is then pulled into the tubes 18 and the air is distributed throughout the greenhouse through holes in the tubes 18. This circulation can continue as the temperature is maintained at its desired level. If the air needs to be heated, known heating systems can be employed within the greenhouse with one such system supplying heated water to rails or pipes in the greenhouse floor. Alternatively, heated water can be supplied to the heat exchanger 29 from the supply of heated water as described above. Air heated by this system can then be circulated until the desired temperature is achieved within the greenhouse 10. Alternatively, the growing section can rely on the heat generated from sunlight passing into the growing section through the transparent roof or sidewalls.

As mentioned above, the system 12 can also be operated to supply a combination of air to the tubes 18 from a combination of airflows 38 and 40. This can be accomplished by controlling the opening of the first and second louvers 30 and 36 while the fans 20 are operating. The fans 20, first and second louvers 30, 36 and the heat exchanger 29, are preferably operated under computer control using various known sensors and hardware/software combinations.

The greenhouse 10 and its forced greenhouse climate control system 12 provide for improved and cost effective control of the greenhouse climate compared to conventional systems. It is particularly useful in desert climates where it is useful to provide cost effective systems for minimizing the maximum heat experienced by crops within a greenhouse. For example, one embodiment of the greenhouse 10 can reduce what would typically be 33° C. temperature in greenhouse to 26° C. without employing expensive cooling systems. This reduction in temperature can have a dramatic impact on the improved health and growth of crops within the greenhouse.

Figure 5:
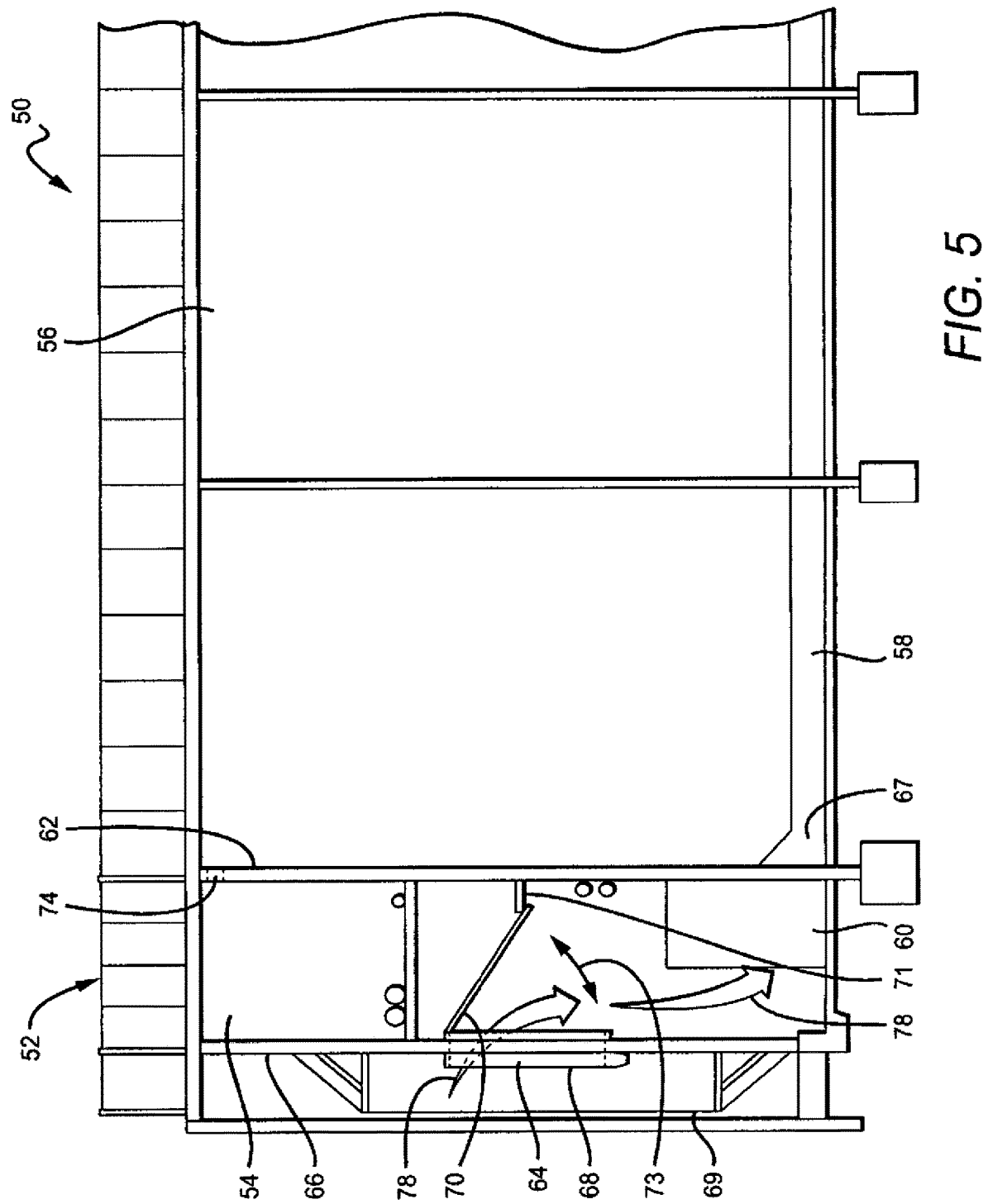
FIG. 5 is a side sectional view of another embodiment of a greenhouse climate control system according to the present invention showing one mode of air-flow
Figure 6:
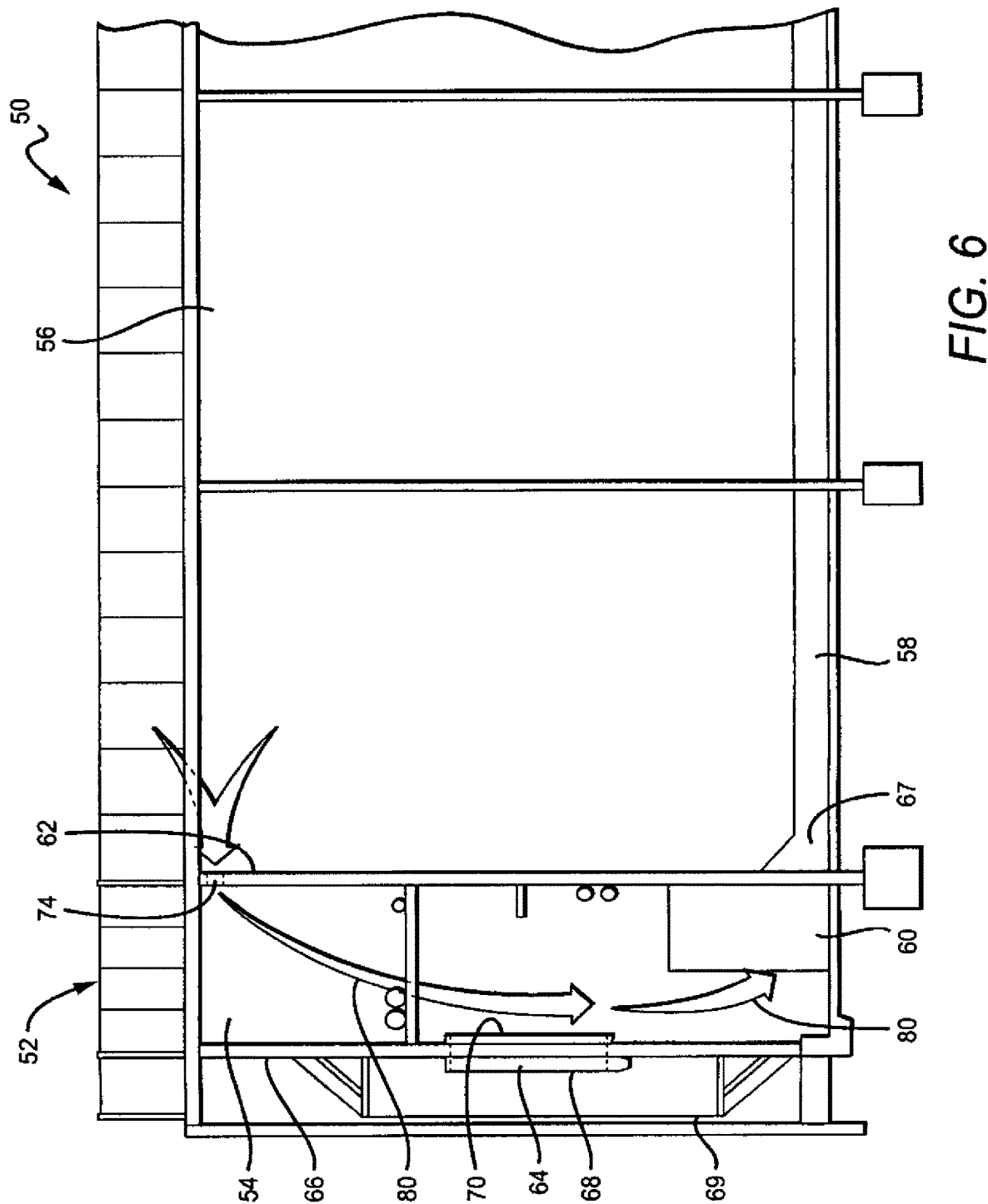
FIG. 6 shows the greenhouse climate control system in FIG. 1 showing another mode of air flow.
Figure 8:
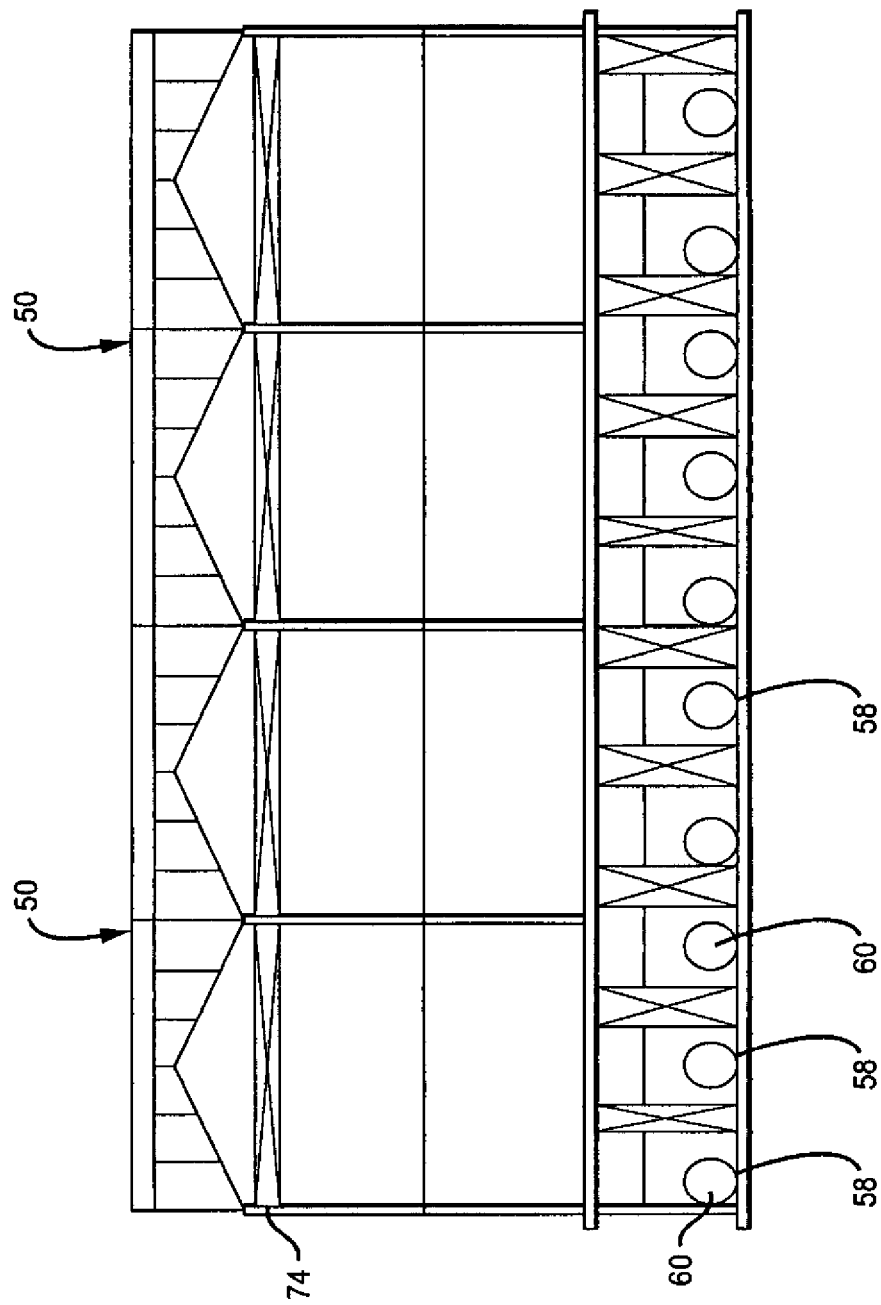
FIG. 8 is an end view of one embodiment of a greenhouse climate control system according to the present invention.

FIGS. 5-7 show another embodiment of greenhouse 50 that is similar to the greenhouse 10 described above and shown in FIGS. 1-4. The greenhouse 50 also utilizing a forced greenhouse climate control system 52 according to the present invention. The greenhouse 50 has a gabled end that is separated from the crop holding section 56 of the greenhouse 50 by partition 62. The crop section 56 comprises an air distributing device to distribute air from the gabled end 54 throughout the crop section 56. Many different distribution devices can be used, with a suitable device being a plurality of tubes 58 running the length of the crop section 56 similar to the tubes 18 in greenhouse 10. As mentioned above, different numbers of tubes can be used with greenhouse 10 shown having five (5) tubes 58 as best shown in FIG. 7. The tubes 58 open through the partition 62 such that air from the gabled end 54 can flow into the tubes 58.

Fans 60 can placed in or close to the partition 62 between. As best shown in FIG. 7, each of the tubes 58 are connected to an opening 64 in the partition lower portion of the partition 22. A respective fan 60 is then arranged over each of the openings and air from each of the fans 60 flows into its respective one of the tubes 58. The fans 60 are arranged with the ability to pull ambient air from in the gabled end 54 into the tubes during operation. This can either be ambient air or re-circulated air, or combination of the two.

The greenhouse 50 further comprises a vent/opening ("vent") in the outside gable wall 66 through which ambient air can enter the gabled end 54. The vent 64 is similar to the opening 24 in greenhouse 10 described above but is located near the center of the gabled wall 66, as shown. The vent 64 preferably runs the length of the gabled wall and although one vent 64 is shown it is understood that more than one opening can be included.

A cooling mechanism 68 can also be included at the vent 64 to cool air being pulled in into the gabled end 54, and/or to control the humidity within the air. In one embodiment the cooling mechanism 68 is a conventional pad cooling system that also runs the length of and is included over the vent 64. A screen 69 can also be included over the vent 64 to prevent insects and other pests from entering the greenhouse 50. A heat exchanger 67 can also be included at or near the fans 60 that is arranged and operates similar to the heat exchanger 29 shown in FIGS. 1 and 2 and described above. The heat exchanger 67 can further heat or cool air entering the tubes 58 as described above.

A first louver 70 can be included inside of gable wall 66 that is movable in the directions of arrows 73 to control the amount of ambient air entering the end gable 54. When operating in the mode to block air from entering the end gable 54 the louver 70 is closed to cover the vent 64. When operating in the mode to allow air to enter the end gable 54, the louver 70 can be swing open so that it is not blocking air from entering or can be partially opened such that it is partially blocking air from entering. As the louver 70 swings from its closed and fully blocking position over the first vent/opening 64 it also blocks re-circulating air that would otherwise be pulled into the tubes 58 by the fans 60. The greenhouse further comprises a shelf 71 on the inside surface of the partition 62. When the louver 70 is fully opened its lower surface abuts the shelf 71 to fully block re-circulating air from being drawn by the fans 60. Instead, in this position the fans 60 draw primarily ambient air that can be cooled by cooling mechanism 68. It is understood that many different mechanisms can be used beyond the first louver 70 described above.

The partition 62 comprises a second vent/opening 74 that is located near the top of the partition 62, although the vent 74 can be in many different locations. Unlike the vent 34 described above in greenhouse 10, the vent 74 does not have a second louver and remains open through operation. The amount of air from the crop section 56 drawn through by the fans and re-circulated into the tubes is controlled by the extent to which the louver 70 is opened. If the louver 70 is fully closed all of the air drawn through the fans 60 comes through vent 74 for re-circulating. When the louver 70 is fully open no air through the vent is drawn by the fans. When the louver is at different positions between fully open and closed, the fans draw a combination of ambient and air through the vent 74.

The crop section 56 can also comprise one or more conventional greenhouse vents (not shown) to allow excess air to be released from the greenhouse 50. These vents are generally known in the art and are not described herein. The greenhouse vents are preferably located at or near the greenhouse roof and can include fans to assist in the release of air. It is understood that air can be released from the greenhouse using many different mechanisms beyond conventional vents.

The greenhouse 50 operates similar to the greenhouse 10. In operation, when the air temperature within the crop section 56 rises it may be desirable to pull cooler air into the section 56. This is referred to as the cooling mode and is illustrated by the first airflow 78 shown in FIG. 5. The louver 70 can be at least partially opened to allow ambient air to pass through the first vent 64. Fans 60 can be activated to pull ambient air through the vent 64 and in those embodiments where additional cooling of the air is desired, the cooling mechanism 68 can be activated to cool the air pulled through the vent 64. The cooled air enters the gabled end 54 and is pulled into the tubes 58 by the fans 60. The cooled air can be further cooled by heat exchanger 67 and the cooled air is then distributed evenly throughout the crop section 56 through the holes in the tubes 58. As additional ambient air is pulled into the greenhouse, excess air can be released from the greenhouse through roof vents.

When the air within the greenhouse is at the desired temperature the greenhouse enters the recycle mode as shown by second airflow 80 in FIG. 6. The first louver 70 can be closed and the fans 60 can then be activated to pull air from within the greenhouse section 56 into the gabled end through the second vent 74. This circulation can continue as the temperature is maintained at its desired level. If the air needs to be heated, known heating systems can be employed within the greenhouse with one such system supplying heated water to rails in the greenhouse floor as described above. Alternatively, warm water can be supplied to the heat exchanger 67 from the separate heated water supply as described above with reference to heat exchanger 29. As ambient or recycled air passes through the fans 60 it is heated and passed into tubes 58. As the heated air exits the tubes it heats the air within the crop section. Air heated by this system can then be circulated until the desired temperature is achieved within the greenhouse 50.

As mentioned above, the system 12 can also be operated to supply a combination of air to the tubes 18 from a combination of airflows 78 and 80. This can be accomplished by controlling the opening of the louver 70 while the fans 60 are operating. Like the embodiment above, the fans 60, louver 70, heat exchanger 67 are preferably operated under computer control using various known sensors and hardware/software combinations.

It is understood that there are many additional advantages and alternative arrangements provided by the present invention. One advantage is that the crop section can be over-pressurized by the system 52, which can prevent undesired insects. The invention further provides for enhanced crop yields by allowing for greater levels of radiation to reach the plants by eliminating conventional roof vent superstructures and accompanying insect netting. The crop section 56 can also be arranged so that a gas, such as $CO_2$ can be fed into and more efficiently maintained within the section 56. The gas feed systems are known in the art and not discussed in detail herein. These gasses can further enhance the health and growth of the crop within section 56.

In alternative embodiments, the fans 60 can be controlled and operated as variable drive fans to provide additional control over airflow. The vents can be different sizes and more vents can be included in many different locations.

In still other embodiments, the greenhouse can be arranged without a gabled end. For example, the first louver can be arranged over the fans with the cooling mechanism located at the fans such that ambient air can be pulled directly into the tubes with the air passing the cooling mechanism for additional cooling. Pipes can be included and arranged to provide an air passageway between the second vent and the fans during the mode when air from within the crop section is to be recycled. This is only one of the many alternative arrangements for greenhouses and forced greenhouse climate control systems according to present invention.

Although the present invention has been described in detail with reference to certain preferred configurations thereof, other versions are possible. Therefore, the spirit and scope of the invention should not be limited to the versions described above.

I claim:
1. A greenhouse, comprising:
a greenhouse structure having outside walls and a floor, said greenhouse structure comprising a climate control system and a growing section;
wherein said climate control system is separated by a partition from said growing section, wherein said partition is parallel to and runs the entire length of one of the sides of said greenhouse structure such that said climate control system is bordered only by said walls of said greenhouse structure and said partition, said climate control system arranged to control the environment within said growing section by flowing ambient air from outside said greenhouse into said growing section and/or by re-circulating air from said growing section back into said growing section, wherein said climate control system comprises one or more vents adapted to draw ambient air into said climate control system, wherein said partition comprises a partition vent to allow air to pass between said growing section and said climate control system, whereby a plurality of tubes are in communication with said one or more vents to regulate the environment of said growing section, wherein said tubes are arranged at the bottom of said growing section to uniformly distribute air to a greenhouse crop within said growing section such that said tubes uniformly distribute air from a location near the bottom of said growing section.

2. The greenhouse of claim 1, wherein said climate control system further comprises fans arranged to flow air into said tubes.

3. The greenhouse of claim 1, further comprising a first louver arranged to cooperate with said one or more vents, said first louver movable to fully block said one or more vents, or to fully open to allow air passage through said one or more vents, or to partially block said one or more vents.

4. The greenhouse of claim 1, further comprising a cooling mechanism operable to cool at least some of the ambient air passing through said one or more vents.

5. The greenhouse of claim 1, wherein said partition vent allows air from said growing section to pass into said climate control system for re-circulating back to said growing section.

6. The greenhouse of claim 5, further comprising a second louver arranged to co-operate with said partition vent, said second louver operable to fully block said partition vent, or to fully open to allow air passage through said partition vent, or to partially block said partition vent.

7. The greenhouse of claim 1, wherein said climate control system further comprises a heater for heating the air flowing into said growing section.

8. The greenhouse of claim 1, further comprising a computer based controller for controlling said climate control system.

9. The greenhouse of claim 1, further comprising a gas feed system for feeding gases into said growing section.

10. The greenhouse of claim 1, further comprising a heat exchanger to heat or cool air flowing into said growing section.

11. The greenhouse of claim 10, wherein water is flowed through said heat exchanger to cool air flowing in said growing section, said water being warmed while cooling said air.

12. The greenhouse of claim 11, wherein said warmed water is stored for use in said heat exchanger to heat air flowing into said growing section.

13. The greenhouse of claim 1, wherein said tubes comprise holes, said holes varying in pattern across the length of said tubes.

14. A greenhouse, comprising:
a greenhouse structure having outside walls and a floor, said greenhouse structure comprising a climate control system and a growing section;
wherein said climate control system is separated by a partition from said growing section, wherein said partition runs from the floor of said greenhouse structure and the entire length of one of said outside walls, wherein said partition is parallel to said one of said outside walls such that at least part of said climate control is within the entire area formed by said walls of said greenhouse structure and said partition, said climate control system arranged to control the environment within said growing section by flowing ambient air from outside said greenhouse into said growing section, re-circulating air from said growing section back into said growing section, and a combination thereof, said ambient air, re-circulated air, or combination thereof, flowing through said climate control system and into said growing section, wherein said climate control system comprises one or more vents adapted to draw ambient air into said climate control system, wherein said partition comprises a partition vent to allow air to pass between said growing section and said climate control system, whereby a plurality of tubes are in communication with said one or more vents to regulate the environment of said growing section.

15. The greenhouse of claim 14, wherein said tubes are disposed within said growing section, air entering said growing section from said climate control system passing into said tubes with said tubes distributing air throughout said growing section.

16. The greenhouse of claim 14, wherein said climate control system further comprises fans arranged to flow air into said tubes.

17. The greenhouse of claim 14, wherein said climate control system further comprises a heater for heating the air flowing into said growing section.

18. The greenhouse of claim 14, further comprising a cooling mechanism operable to cool at least some of the ambient air passing through said one or more vents.

* * * * *